April 25, 1939. F. BENDHEIM ET AL 2,155,525
WRINGER DRIVE MECHANISM
Filed Feb. 5, 1935 2 Sheets-Sheet 1
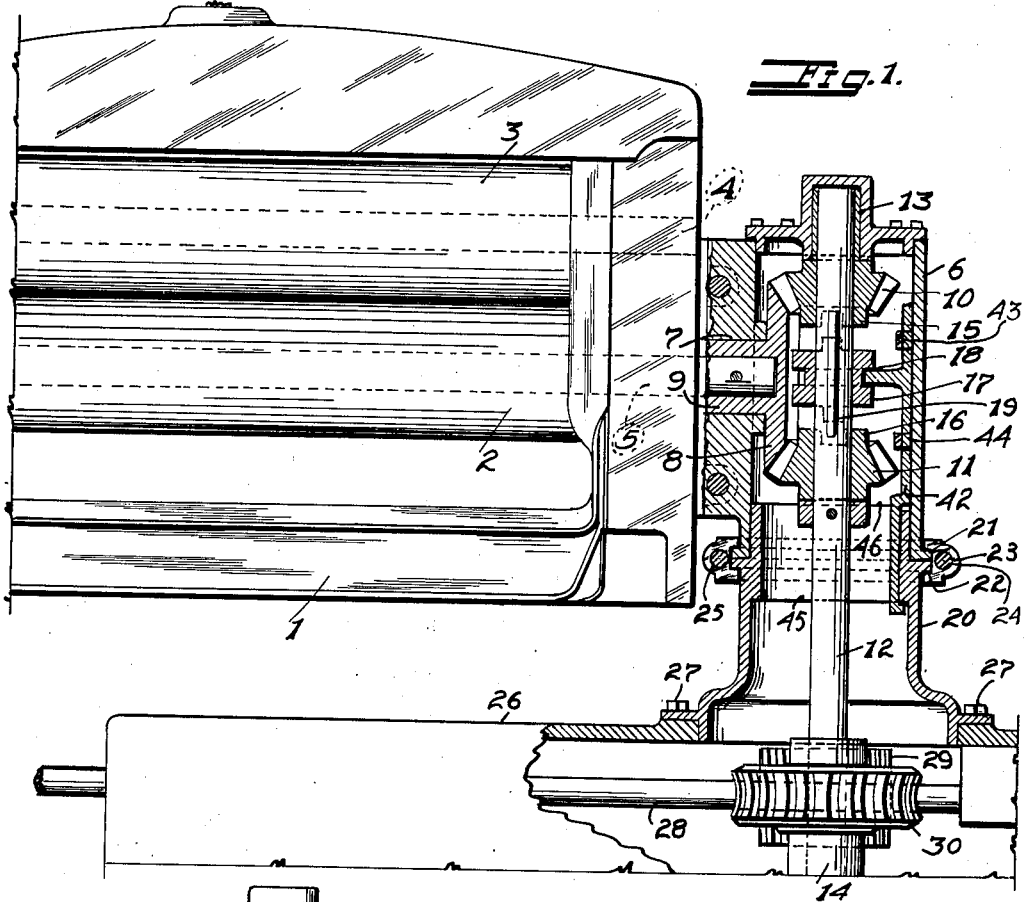
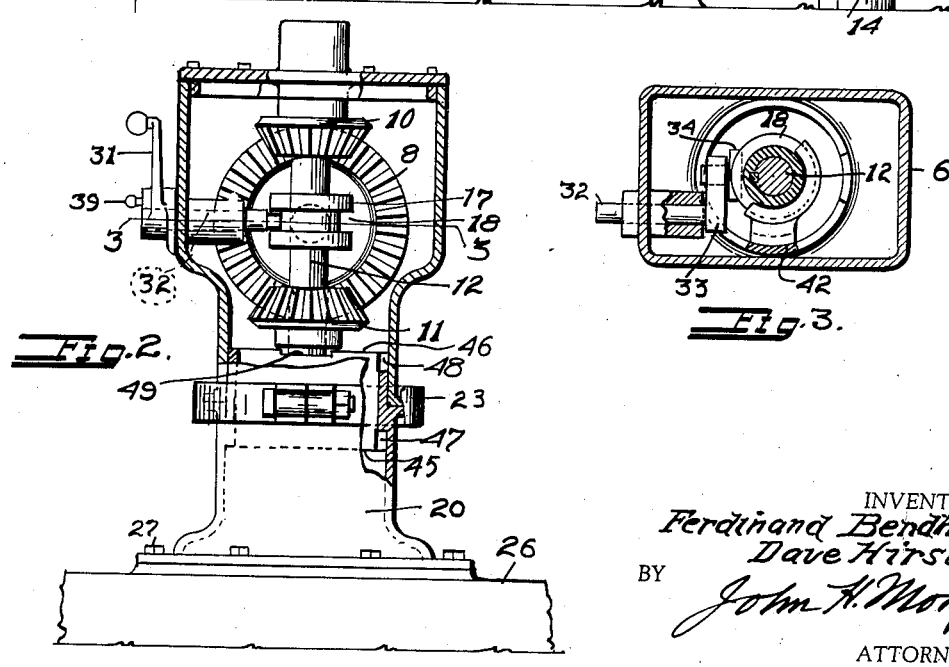
INVENTORS:
Ferdinand Bendheim,
Dave Hirstel.
BY John H. Morgan
ATTORNEY.

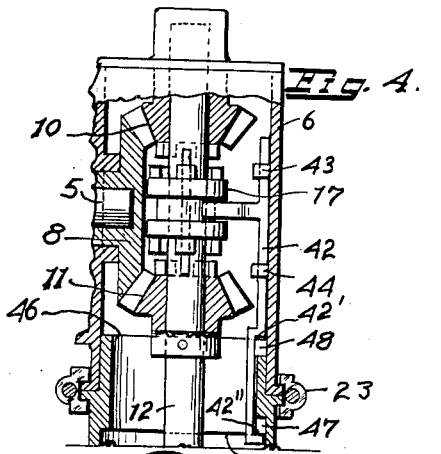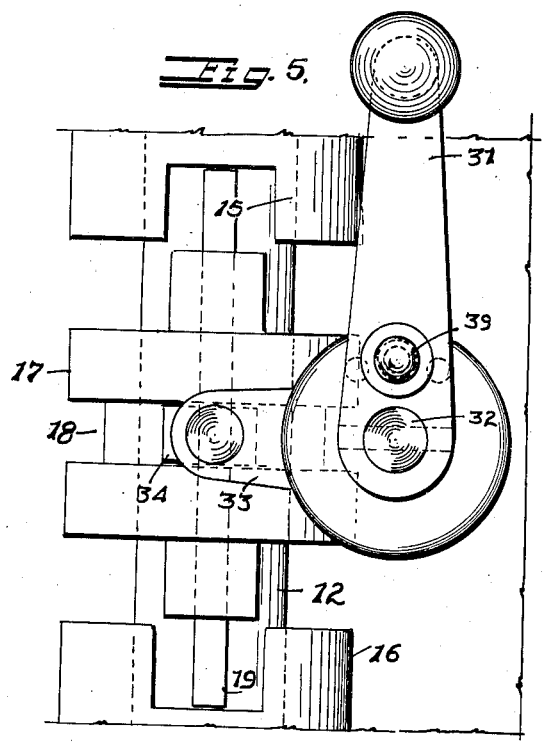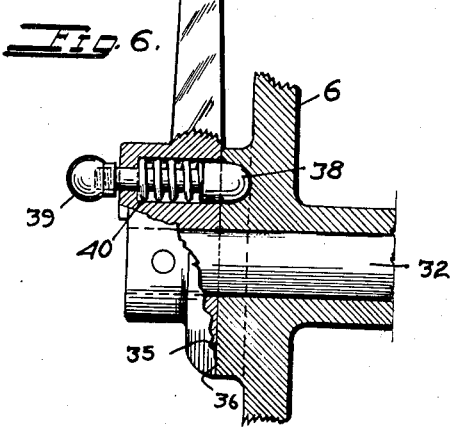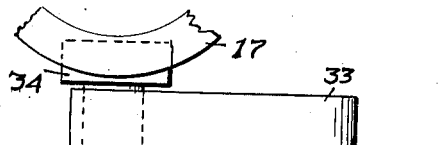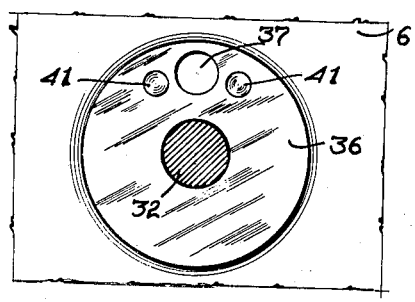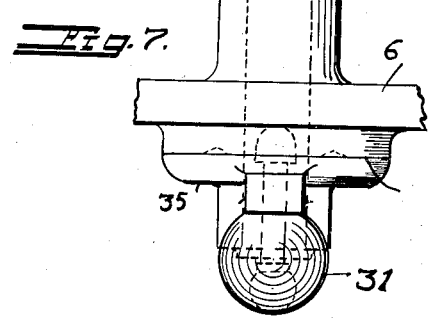

Patented Apr. 25, 1939

2,155,525

UNITED STATES PATENT OFFICE 2,155,525

WRINGER DRIVE MECHANISM

Ferdinand Bendheim and Dave Hirstel, San Francisco, Calif.

Application February 5, 1935, Serial No. 5,050

6 Claims. (Cl. 68—255)

This invention relates to wringer drive mechanism and more particularly to the construction of a swinging wringer having features including a safety reversing clutch.

This wringer drive mechanism is adapted to be driven by the same shaft that drives a washing machine agitator for a washing machine, although the washing machine forms no part of this invention.

The principal object of the invention is to provide safety means to protect the mechanism of the wringer at all times. One feature of which is the provision of means to prevent the wringer from being thrown into gear when swung around in certain positions which are predetermined.

Another feature is the means to prevent the clutch from being thrown into reverse by mistake or by a sudden and forceful jerk, this means providing a positive stop at the neutral position of the clutch.

Another object is to provide means to positively lock the slidable clutch in neutral position, and means to prevent the clutch being operated, except in predetermined operating positions by two distinct actions of the operator, to prevent accidental starting of the rolls.

Other objects of the invention will appear to those skilled in this art as the description progresses.

An embodiment of the invention is shown in the accompanying drawings in which the same reference numeral is applied to the same portion throughout the several views, and of which there may be modifications.

Figure 1 is a view showing the wringer swung around to the side and out of operation, the drive mechanism being shown in section.

Figure 2 is a view looking from the right of Figure 1 partly in section.

Figure 3 is a view on line 3, 3, of Figure 2.

Figure 4 is a sectional view showing the mechanism in the position in which it may be thrown into gear in either direction.

Figure 5 is an enlarged view showing the clutch lever for operating the clutch.

Figure 6 is a side view of the clutch lever partly in section showing the positive stop in neutral.

Figure 7 is a plan view of the clutch lever.

Figure 8 is a view of the surface against which the clutch lever rotates and showing the positive stop opening and the full throw indentations.

The wringer is indicated by the numeral 1 having the rolls 2 and 3 on shafts 4 and 5. The shaft 5 is the drive shaft and it has bearings in the wringer frame and in the rotatable housing 6 at 7. A bevel gear 8 fixed on the hub 9 of the shaft which turns in the bearing 7.

The bevel gear is in mesh with the bevel pinions 10 and 11 loosely mounted on the vertical shaft 12 which has a bearing 13 in the rotatable housing, and a bearing 14 in the stationary part of the base.

The bevel pinions have clutch jaws 15 and 16 adapted to mesh with the jaws on the slidable clutch member 17 which has the annular groove 18 by which it is operated.

The slidable clutch member slides on a key 19 in the shaft.

The rotatable housing is mounted on the fixed housing 20 by means of the flanges 21 and 22 and a split collar 23 held together by the bolts 24 and 25. The housing 20 is bolted to the base 26 by the bolts 27. The vertical shaft 12 is driven by a shaft 28 through a worm 29 and a worm gear 30 in the base. The horizontal shaft 28 may be driven by any suitable motor.

The slidable clutch member 17 is operated by the clutch lever 31 which is fixed to the pin 32. This operates a crank 33 and a pivoted member 34 which fits in the groove 18 so that a movement of the lever acts to slide the clutch to engage either the upper or lower pinion by the meshing of the clutch jaws.

To hold the slidable clutch member in the neutral position, that is out of engagement with the clutch jaws on either pinion, the lever has a face 35 which bears against and is adapted to rotate on a face 36 on the housing, and on this face there is a hole 37 adapted to receive the end of the pin 38 to form a positive lock in neutral position until the pin is removed. This is done by pulling the pin out by means of the knob 39. A spring 40 acts to force the pin into the opening when it is in alignment therewith, in which alignment the clutch is in the neutral position.

To hold the clutch in mesh indentations or shallow holes 41 are provided. These hold the lever in the required position but do not form a positive lock, so that the wringer may be thrown out of gear simply by moving the clutch lever 31 until the pin 38 snaps into the hole 37 positively locking it from further movement until the pin 38 is raised by the knob 39.

To prevent the wringer from being thrown into gear except in positions where it is required to have the wringer operate, a slidable member 42 having brackets 43 and 44 is provided and this member has bearing surfaces 42' and 42" which is adapted to slide on the lower shoulder 45 and the upper shoulder 46.

As the wringer and housing is swung around these bearing surfaces sliding on the shoulders would prevent the clutch from being moved up or down so a notch 47 on the lower shoulder and a notch 48 on the upper shoulder is provided at the point where it is required to operate the wringer so that the clutch may be thrown in to operate the wringer rolls in either direction.

To hold the wringer in any predetermined position and still not allow the clutch to be moved a shallow notch 49 is provided which allows a little movement of the clutch but not enough to throw it in gear.

From the above description taken with the drawings, it will be seen that the wringer can be swung around out of the way, and that it will be impossible to throw the rolls in gear in any position but the predetermined one, and that the clutch cannot be thrown in gear without pulling out the stop pin, and that the clutch cannot be thrown out and across to reverse the wringer without pulling out the stop pin.

Having thus described our invention, what we desire to secure by Letters Patent of the United States is as follows, but modifications may be had in carrying out the invention as shown in the accompanying drawings and particularly described form thereof within the purview of the annexed claims.

We claim—

1. In a wringer support and drive comprising a stationary supporting member, a wringer bracket pivoted on the supporting member so as to be swingable about a vertical axis, and a transmission carried by the bracket and including an element shiftable vertically into three positions, the drive to the wringer being in one direction when the element is in one extreme position, in the other direction when the element is in the other extreme position, and being disconnected when the element is in its intermediate position; a swing lock comprising a fixed annular track on the stationary supporting member concentric with the axis about which the wringer bracket can swing and having upwardly and downwardly facing horizontal surfaces interrupted by recesses in the track, a latch vertically slidable in guides carried by the bracket, connected to the vertically shiftable transmission element so as to move vertically with it, and having portions placed so as to slide on the horizontal track surfaces when the shiftable transmission element is in its intermediate position and the wringer bracket is swung about its vertical axis and to fit into the recesses in the track when the shiftable transmission element is moved to its extreme positions.

2. A wringer operating mechanism of the class described comprising a wringer roll mechanism adapted to swing on its support to predetermined operating positions, a drive for said mechanism including a slidable clutch having an operating lever, means adapted to engage said lever to lock positively said clutch in a non-operative position of said rolls when said mechanism is out of operating position, and means for releasing said positive lock, said lever being removable from locked position only at said operating positions whereby accidental starting of the wringer roll drive mechanism is prevented.

3. A wringer operating mechanism of the class described comprising a wringer roll mechanism adapted to swing on its support to predetermined operating positions, a drive for said mechanism including a slidable clutch having an operating lever, means adapted to engage said lever to lock positively said clutch in a non-operative position of said rolls when said mechanism is out of operating position, and means for releasing said positive lock, said lever being removable from locked position only at said operating positions and means controlled by said clutch to lock the wringer mechanism in said operating positions.

4. A wringer mechanism of the class described, comprising a wringer support held stationary, a wringer bracket pivoted to swing about a vertical axis, rotatable wringer rolls on said bracket, a drive mechanism for said wringer rolls carried by said bracket and having means including a shiftable element adapted to be shifted in selected positions comprising a neutral position, and a plurality of drive establishing positions, a control member for said shiftable element adapted to be positively locked when said shiftable member is in said neutral position, and to be yieldably held in said drive establishing positions, the positive lock at said neutral position preventing accidental rotation of said wringer rolls and preventing sudden movement of said control member from one drive establishing position to another.

5. In a wringer; a plurality of wringer rolls adapted to be rotated in either direction; a source of power; a drive mechanism between said source of power and said wringer rolls including a clutch having a position for driving said rolls in a direction, a position for driving said rolls in the other direction, and a neutral position wherein power is not applied to the rolls; means to shift said clutch from one of said positions to another; said rolls being mounted for swinging about said drive mechanism in and out of working position; means to prevent said swinging unless said clutch is in neutral position and to prevent shifting of said clutch out of neutral position unless said rolls are in working position; and independent means positively to lock said shifting means in neutral position; whereby power cannot be applied to said rolls unless they are in working position and said locking means is independently opened.

6. In a wringer; a plurality of wringer rolls adapted to be rotated in either direction; a source of power; a drive mechanism between said source of power and said wringer rolls including a clutch having a position for driving said rolls in a direction, a position for driving said rolls in the other direction, and a neutral position wherein power is not applied to the rolls; means to shift said clutch from one of said positions to another; said rolls being mounted for swinging about said drive mechanism in and out of working position; means to prevent said swinging unless said clutch is in neutral position; means positively to lock said shifting means in neutral position when said rolls are out of working position; and another and independent means positively to lock said shifting means in neutral position; whereby power cannot be applied to said rolls unless they are in working position and said locking means is independently opened.

FERDINAND BENDHEIM.
DAVE HIRSTEL.